United States Patent [19]

Swanson, Jr. et al.

[11] 4,442,739

[45] Apr. 17, 1984

[54] MULTI-SPINDLE WORK TRANSFER DEVICE

[75] Inventors: Sven V. Swanson, Jr., New Britain; Richard G. Swanson, West Hartford, both of Conn.

[73] Assignee: Litton Industrial Products, Inc., New Britain, Conn.

[21] Appl. No.: 390,178

[22] Filed: Jun. 21, 1982

[51] Int. Cl.³ ............................................. B23B 13/04
[52] U.S. Cl. ........................................ 82/2.5; 82/2 D; 29/38 A; 29/563; 74/89.17
[58] Field of Search ...................... 82/2.5, 2.7, 3, 2 D; 29/563, 38 A; 74/89.17, 422, 842

[56] References Cited

U.S. PATENT DOCUMENTS

| | | | |
|---|---|---|---|
| 2,542,318 | 2/1951 | Faverty et al. | 82/2.5 |
| 3,365,989 | 1/1968 | Bullard et al. | 82/3 |
| 3,587,369 | 6/1971 | Reiners | 82/2.5 |
| 4,159,660 | 7/1979 | Buckley et al. | 82/3 |
| 4,197,769 | 4/1980 | Smith et al. | 82/3 |

Primary Examiner—Leonidas Vlachos
Assistant Examiner—Jerry Kearns
Attorney, Agent, or Firm—Spencer T. Smith

[57] ABSTRACT

A machine tool including a base having a work zone including a drive gear, a work shuttle having a pair of work stations each having at least one work spindle and an idler gear, the work shuttle assembly is mounted on the base and is displaced to alternately locate each of the work stations at the work zone and at a load/unload zone, and each of the work spindles is presented at a predetermined orientation at the work and load/unload zones by means of a gear rack mounted on the base for engaging each of the idler gears as the shuttle is displaced from one to another of the positions, the gear rack having at least a portion of the teeth thereof removed proximate the drive gear whereby the idler gear of the station located at the work zone will be operatively associated with the drive gear but will not be operatively associated with the gear rack, rotation of the drive gear is prevented as the work shuttle assembly is displaced and rotation of the drive gear is allowed when the work shuttle assembly is located at either of the two positions, and the work shuttle assembly is located at either position.

2 Claims, 3 Drawing Figures

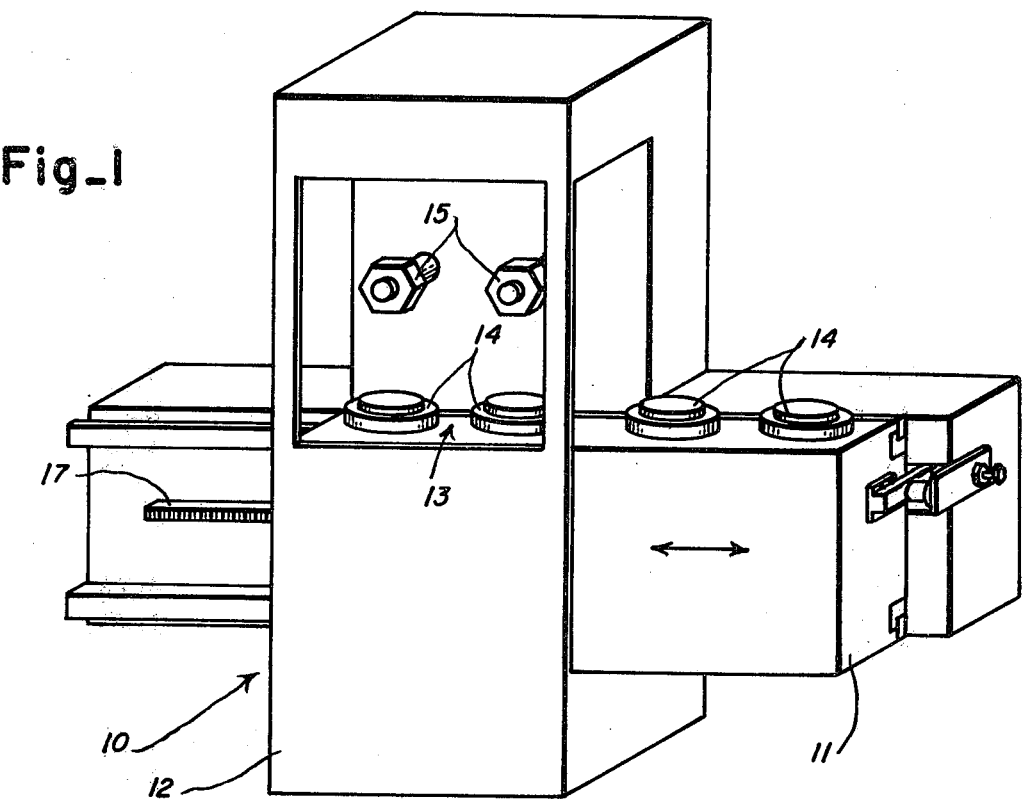
Fig_1
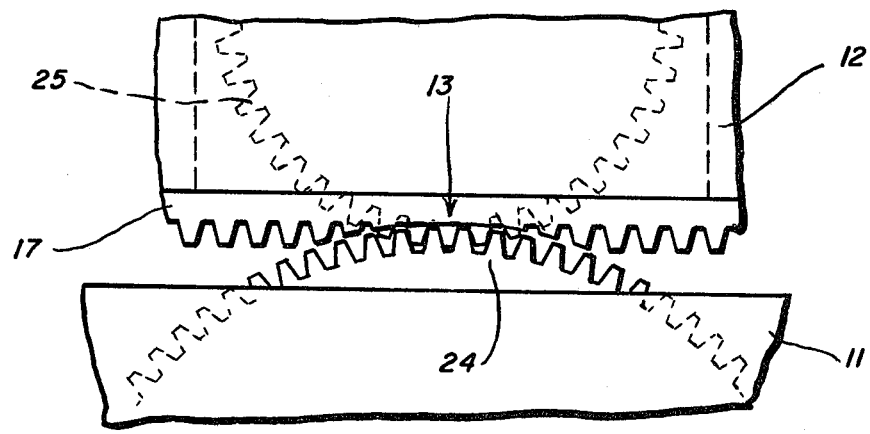
Fig_3

MULTI-SPINDLE WORK TRANSFER DEVICE

BACKGROUND OF THE INVENTION

The invention relates to a work transfer shuttle for machine tools where the workpiece is spindle mounted and the cutters are fixed. The shuttle includes a plurality of stations each having at least one work spindle.

In manually loaded machines, the rotational orientation of the spindle head is of little consequence but for automatic loading into other than a cylindrical clamping device a predetermined orientation is critical. In this invention, all of the spindles at all of the stations are in precisely the same rotational position relative to the machine for loading, unloading and stopped at the work zone.

SUMMARY AND OBJECTS OF THE INVENTION

A multi-spindle work transfer device is comprised of a shuttle assembly which houses a plurality of spindles and associated gearing and which transports workpieces to and from the work zone while maintaining the same precise, predetermined, rotational orientation at the work zone and at each of the load/unload stations. The shuttle assembly is mounted to a base which powers the spindles and transfers the shuttle to and from the work zone.

It is therefore an object of the invention to provide a multi-spindle work transfer device.

It is further an object of the invention to provide a transfer device which is comprised of a plurality of spindles.

It is further an object of the invention to provide a transfer device wherein each of the spindles can be shuttled to and from the machine work zone, singly or in combination, as work stations.

It is further an object of the invention to provide a transfer device whose work spindles are each in the same rotational orientation relative to the machine at every station including the work zone when not powered.

It is further an object of the invention to provide a transfer device whose shuttle assembly is mechanically fixed to prevent motion when at station.

BRIEF DESCRIPTION OF THE DRAWING

FIG. 1 is an oblique view of a machine tool made in accordance with the teachings of the present invention;

FIG. 3 is an enlarged view of a portion of the shuttle assembly illustrated in FIG. 2.

DESCRIPTION OF THE PREFERRED EMBODIMENT

Figure 2:
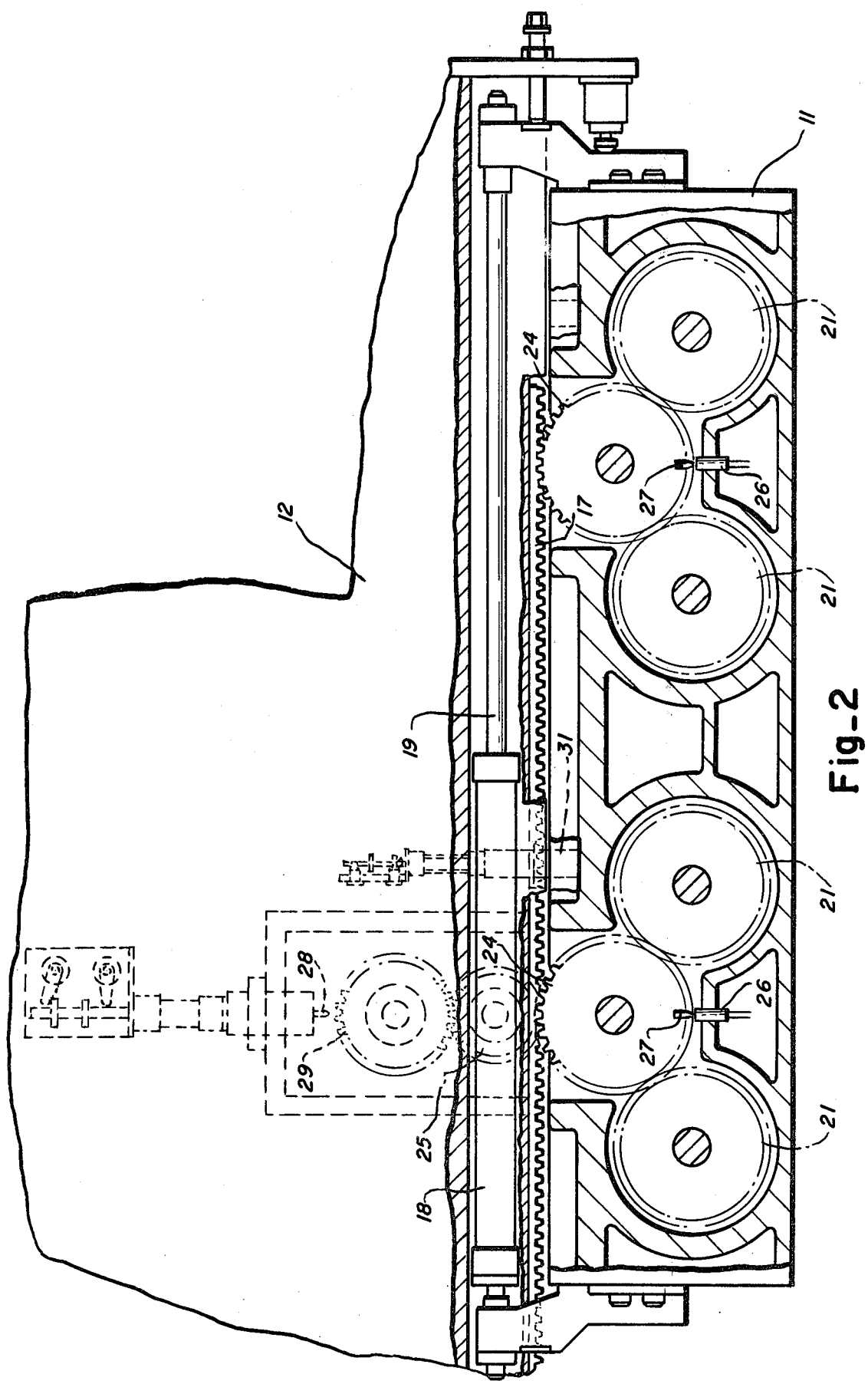
FIG. 2 is a top cross-sectional view of the shuttle assembly of the machine tool illustrated in FIG. 1.

The multi-spindle work transfer device 10, illustrated in FIG. 1 which can be for a vertical boring machine, for example, is comprised of a base assembly 12 on which is mounted, through conventional means, a shuttle assembly 11 with multiple spindles 14. When positioned at cutting tool holders 15, the spindles 14 are said to be at the work zone 13. When the spindles 14 are outside the work zone 13, they are in a load/unload position. In FIG. 1, the shuttle assembly 11 is comprised of two stations each made up of two spindles 14. The shuttle 11 is caused to traverse the base 12 and alternatively present each of the stations to the work zone 13 and to the load/unload position.

Referring to FIGS. 2 and 3, the actuator rod 19 connected to the shuttle assembly 11 is moved axially by actuator 18 which is fixed to the machine tool base assembly 12. As the shuttle 11 traverses the base 12, the idler gears 24 meshed to special gear rack 17, which is affixed to the base 12, drive the spindle drive gears 21.

The section of the gear rack 17, central to the work zone 13, has a portion of the teeth removed, see FIG. 3, such that idler gears 24 can rotate free of the gear rack 17 when at the work zone 13. As the gears 24 enter that section of the gear rack 17 wherein a portion of the teeth are removed, they engage power drive gear 25 which is held fixed by high speed drive gear 29 which in turn is held locked by gear shot pin 28. When the shuttle assembly 11 has positioned either pair of spindles 14 at the work zone 13, the shuttle shot pin 31 engages one of the pair of notches in the work shuttle assembly to prevent any motion in the shuttle through the work cycle, the gear shot pin 28 is withdrawn and power is applied to the spindles 14 through power drive gear 25.

After completing a work cycle and anticipating exchange of the shuttle stations, the drive gear 25 is caused to stop when the slug 27 mounted on the gear 24 is aligned with proximity switch 26 fixed to shuttle assembly 11 re-establishing the precise rotational orientation of the spindles 14.

What is claimed is:

1. A machine tool comprising
   a base having a work zone including a machine drive gear and tool means for performing a machining operation,
   a work shuttle assembly including a pair of work stations each having at least one work spindle having a drive gear and an idler gear operatively associate with said spindle drive gear,
   means for mounting said work shuttle assembly on said base for displacement between first and second positions selected to alternately locate each of said work stations at said work zone and at a load/unload zone, and
   means for displacing said shuttle between said first and second positions,
   means for presenting each of said work spindles at a predetermined orientation at said work and load-/unload zones including
   a gear rack mounted on said base for engaging each of said idler gears as said shuttle is displaced from one to the other of said positions,
   said gear rack having at least a portion of the teeth thereof removed proximate said machine drive gear whereby the idler gear of the station located at said work zone will be operatively associated with said machine drive gear but will not be operatively associated with said gear rack,
   means for preventing the rotation of said machine drive gear as said work shuttle assembly is displaced between said two positions and for allowing the rotation of said machine drive gear when said work shuttle assembly is located at either of said two positions, and
   means for locking said work shuttle assembly at either of said two positions, and
   means for driving the work spindle located at said work zone including said machine drive gear.

2. A machine tool according to claim 1, wherein said gear track teeth proximately said drive gear define a surface corresponding to the outer surface of said idler gear.

* * * * *